US006300383B1

(12) United States Patent
Baba et al.

(10) Patent No.: US 6,300,383 B1
(45) Date of Patent: Oct. 9, 2001

(54) SILICONE RUBBER SPONGE COMPOSITION, SILICONE RUBBER SPONGE, AND PROCESS FOR MAKING THE SPONGE

(75) Inventors: Katsuya Baba; Hiroshi Honma; Akito Nakamura, all of Chiba Prefecture (JP)

(73) Assignee: Dow Corning Toray Silicone Company, Ltd., Tokyo (JP)

( * ) Notice: Subject to any disclaimer, the term of this patent is extended or adjusted under 35 U.S.C. 154(b) by 0 days.

(21) Appl. No.: 09/821,682

(22) Filed: Mar. 29, 2001

(30) Foreign Application Priority Data

Apr. 25, 2000 (JP) .................................................. 12-124359

(51) Int. Cl.$^7$ ........................................................ C08J 9/32
(52) U.S. Cl. ............................ 521/54; 521/134; 521/154; 521/79; 521/81
(58) Field of Search .............................. 521/54, 134, 154, 521/79, 81

(56) References Cited

U.S. PATENT DOCUMENTS 3,865,759 * 2/1975 Smith .................................... 521/154
4,686,244 * 8/1987 Dietlein et al. ....................... 521/154
4,719,249 * 1/1988 Dietlein et al. ....................... 521/154

FOREIGN PATENT DOCUMENTS 44-461  6/1963 (JP) .
7-247436  5/1992 (JP) .

* cited by examiner

Primary Examiner—Morton Foelak
(74) Attorney, Agent, or Firm—James L. De Cesare

(57) ABSTRACT

A silicone rubber sponge composition, a silicone rubber sponge, and a process for making the silicone rubber sponge. The silicone rubber sponge composition comprises (A) 100 parts by weight organopolysiloxane gum described by average structural unit $R_aSiO_{(4-a)/2}$, where R is a monovalent hydrocarbon group or haloalkyl and a is 1.8 to 2.3 and having a viscosity of 1,000,000 mPa·s or above at 25° C., (B) 1 to 400 parts by weight inorganic filler, (C) 0.01 to 50 parts by weight hollow thermoplastic resin particles, (D) 0.1 to 10 parts by weight liquid compound with a boiling point above room temperature, and (E) a curing agent in an amount sufficient to cure the composition.

15 Claims, No Drawings

SILICONE RUBBER SPONGE COMPOSITION, SILICONE RUBBER SPONGE, AND PROCESS FOR MAKING THE SPONGE

FIELD OF THE INVENTION

The present invention relates to a silicone rubber sponge composition, a silicone rubber sponge, and a process for making the sponge. More particularly, it relates to a silicone rubber sponge composition that gives a silicone rubber sponge having fine, uniform cells, a silicone rubber sponge, and a process for making the silicone rubber sponge.

BACKGROUND OF THE INVENTION

Due to their outstanding heat and weather resistance and light weight, silicone rubber sponges are used for automotive parts, such as packings, gaskets, and O-rings; as sheath materials for rollers in copiers, and as sealing materials of various kinds. A number of silicone rubber sponge compositions have been proposed to date. Patent Publication (Kokoku) 44-461 and Unexamined Patent Application Laying Open 7-247436, for example, teach silicone rubber sponge compositions containing thermally decomposable organic blowing agents such as azobisisobutyronitrile. However, silicone rubber sponges produced from these compositions tend to have coarse cells, making it difficult to consistently produce silicone rubber sponges having fine, uniform cells. Accordingly, there is a need for a silicone rubber sponge composition having finer cells.

It is an object of the present invention to provide a silicone rubber sponge composition that gives a silicone rubber sponge having fine, uniform cells, a silicone rubber sponge, and a process for production of the sponge.

SUMMARY OF THE INVENTION

The present invention relates to a silicone rubber sponge composition, a silicone rubber sponge, and a process for making the silicone rubber sponge. The silicone rubber sponge composition comprises (A) 100 parts by weight organopolysiloxane gum described by average structural unit $R_aSiO_{(4-a)/2}$, where R is a monovalent hydrocarbon group or haloalkyl and a is 1.8 to 2.3 and having a viscosity of 1,000,000 mPa·s or above at 25° C., (B) 1 to 400 parts by weight inorganic filler, (C) 0.01 to 50 parts by weight hollow thermoplastic resin particles, (D) 0.1 to 10 parts by weight liquid compound with a boiling point above room temperature, and (E) a curing agent in an amount sufficient to cure the composition.

DESCRIPTION OF THE INVENTION

A first embodiment of the present invention is a silicone rubber sponge composition comprising (A) 100 parts by weight organopolysiloxane gum described by average structural unit $R_aSiO_{(4-a)/2}$, where R is a monovalent hydrocarbon group or haloalkyl and a is 1.8 to 2.3 and having a viscosity of 1,000,000 mPa·s or above at 25° C., (B) 1 to 400 parts by weight inorganic filler, (C) 0.01 to 50 parts by weight hollow thermoplastic resin particles, (D) 0.1 to 10 parts by weight liquid compound with a boiling point above room temperature, and (E) a curing agent in an amount sufficient to cure the composition.

A second embodiment of the present invention is a silicone rubber sponge produced by heat curing of the silicone rubber sponge composition. A third embodiment of the present invention is a process for production of a silicone rubber sponge composition comprising the steps of combining components (A) and (B) to produce a silicone rubber base compound, and incorporating component s (C), (D), and (E) into the silicone rubber base compound. A fourth embodiment of the present invention is a process for production of a silicone rubber sponge comprising the step of curing the composition by heating to a temperature equal to or above the softening point of the thermoplastic resin of component (C).

Component (A) is the principal component of the present composition. It must have a viscosity at 25° C. of 1,000,000 mPa·s or above, and preferably 5,000,000 mPa·s or above. Since component (A) is a gum, it will have Williams plasticity of 50 or greater, and preferably 100 or greater. The degree of polymerization of component (A) is typically 3,000 to 20,000, with the weight-average molecular weight being $20 \times 10^4$ or above. The class of compounds known as organopolysiloxane gums used as principals in organic peroxide-curing millable compositions can be used for component (A). Component (A) consists of an organopolysiloxane gum described by the following average unit formula $R_aSiO_{(4-a)/2}$, where R is a monovalent hydrocarbon group or haloalkyl and a is 1.8 to 2.3. Monovalent hydrocarbon groups represented by R include alkyls such as methyl, ethyl, and propyl; alkenyls such as vinyl and allyl; cycloalkyls such as cyclohexyl; aralkyls such as β-phenylethyl; and aryls such as phenyl and tolyl. Haloalkyl groups represented by R include 3,3,3-trifluoropropyl and 3-chloropropyl.

Where the curing agent consists of either an alkyl peroxide or a platinum catalyst used concomitantly with a organopolysiloxane containing silicon-bonded hydrogen atoms, the organopolysiloxane gum molecule must have at least two silicon-bonded alkenyls. Alkenyl here refers, for example, to vinyl, ally, propenyl, and hexenyl groups. Silicon-bonded organic groups other than alkenyl include alkyls such as methyl, ethyl, and propyl; aryls such as phenyl and tolyl; and haloalkyls such as 3,3,3-trifluoropropyl and 3-chloropropyl. The molecular structure of component (A) may be linear or linear containing branches. Component (A) may be a homopolymer, copolymer, or a blend of polymers. Specific examples of the siloxane units of component (A) are dimethylsiloxane, methylvinylsiloxane, methylphenylsiloxane, and (3,3,3-trifluoropropyl) methylsiloxane units. Examples of molecular chain terminal endgroups of component (A) are trimethylsiloxy, dimethylvinylsiloxy, methylvinylhydroxysiloxy, and dimethylhydroxysiloxy groups. Examples of such organopolysiloxane gums include methylvinylpolysiloxane gum that is endblocked at both terminals with trimethylsiloxy groups, a copolymer gum of methylvinylsiloxane and dimethylsiloxane that is endblocked at both terminals with trimethylsiloxy groups, dimethylpolysiloxane gum that is endblocked at both terminals with dimethylvinylsiloxy groups, a copolymer gum of methylvinylsiloxane and dimethylsiloxane that is endblocked at both terminals with dimethylvinylsiloxy groups, a copolymer gum of methylvinylsiloxane and dimethylsiloxane that is endblocked at both terminals with dimethylhydroxysiloxy groups, a copolymer gum of methylphenylsiloxane, methylvinylsiloxane, and dimethylsiloxane that is endblocked at both terminals with methylvinylhydroxysiloxy groups, and a copolymer gum of (3,3,3-trifluoropropyl)methylsiloxane, methylvinylsiloxane, and dimethylsiloxane that is endblocked at both terminals with methylvinylhydroxysiloxy groups.

Examples of the inorganic filler of component (B) are reinforcing fillers such as finely divided silica (e.g. dry process silica or wet process silica) and finely divided silica whose surfaces have been treated with an organochlorosilane, organoalkoxysilane, hexaorganodisilazane, organosiloxane oligomer, or the like; and semi-reinforcing or extending fillers such as powdered quartz, diatomaceous earth, heavy calcium carbonate, light calcium carbonate, magnesium oxide, calcium silicate, mica, aluminum oxide, aluminum hydroxide, carbon black, and the like. In excessively large amounts, component (B) is difficult to incorporate into component (A) and accordingly the range 1 to 400 parts by weight per 100 parts by weight of component (A) is preferred, preferably using from 1 to 100 parts by weight for the reinforcing fillers and from 1 to 150 parts by weight for the semi-reinforcing or extending fillers.

The hollow thermoplastic resin particles used for component (C) serve as nuclei for cell formation, and also make cell distribution uniform. An exemplary component (C) is a material consisting of thermoplastic resin shells having an inert gas enclosed therein. Thermoplastic resins include silicone resins, acrylic resins, and polycarbonate resins. In preferred practice, the thermoplastic resin will have a softening point of from 40 to 200° C., and especially 60 to 180° C. Inert gases include air, nitrogen gas, helium gas, and the like. Component (C) average particle size is preferably within the range of 0.1 to 500 μm, and more preferably 1 to 50 μm. Component (C) may be prepared, for example, by spraying an aqueous dispersion of a thermoplastic resin dissolved in a solvent from a spray nozzle into a heated air stream and evaporating the organic solvent while granulating the thermoplastic resin. Component (C) is included in amounts of 0.01 to 50 parts by weight, preferably 0.1 to 40 parts by weight, per 100 parts by weight of component (A).

Component (D), a liquid compound with a boiling point above room temperature, is an essential component that is volatilized and functions as a blowing agent during production of the silicone rubber sponge, as well as giving fine, uniform cells. Component (D) must not undergo reactions, such as thermal decomposition or chemical reactions with other components, during production of the silicone rubber sponge, and must be volatile at temperatures above room temperature. Examples of component (D) are water, aliphatic hydrocarbons such as n-pentane, n-hexane, isohexane, and cyclohexane; alcohols such as methanol, ethanol, and 1-propanol; ethers such as methoxy benzene and tetrahydrofuran; ketones such as acetone and methyl ethyl ketone; and low-molecular weight siloxanes such as low-molecular weight linear dimethylsiloxanes and cyclic dimethylsiloxanes. Water and cyclic dimethylsiloxanes are preferred.

Component (D) is used in amounts of from 0.1 to 10 parts by weight per 10 parts by weight of component (A). In excess of 10 weight parts of component (D) the cells of the sponge tend to become rough and nonuniform, while amounts less than 0.1 weight part do not give sufficient action as a blowing agent. To improve ease of handing and ease of incorporation of component (D) it is permissible to add to component (D) a thickener such as powdered silica, provided that the objects of the invention are not impaired thereby.

Component (E), the curing agent, is an organic peroxide, or a platinum catalyst and an organopolysiloxane containing silicon-bonded hydrogen. Examples of the former type, namely organic peroxides, include benzoyl peroxide, t-butyl perbenzoate, o-methyl benzoyl peroxide, p-methyl benzoyl peroxide, m-methyl benzoyl peroxide, dicumyl peroxide, and 2,5-dimethyl-2,5-di(t-butylperoxy)hexane. The amount of component (E) is preferably 0.1 to 10 parts by weight per 100 parts by weight of component (A).

When component (E) is a platinum catalyst plus an organopolysiloxane containing silicon-bonded hydrogen, examples of the platinum catalyst are finely divided platinum, platinum black, chloroplatinic acid, alcohol-modified chloroplatinic acid, chloroplatinic acid/olefin complexes, chloroplatinic acid/alkenylsiloxane complexes, and chloroplatinic acid/divinyltetramethyldisiloxane complexes. In preferred practice, the amount of component (E), expressed as metallic platinum, is from 0.1 to 500 ppm (weight basis) of the total composition. Organopolysiloxanes containing silicon-bonded hydrogen are crosslinking agents and in the presence of platinum catalysts react with the alkenyl groups in component (A) to cure the present compositions. Examples of organopolysiloxanes containing silicon bonded-hydrogen are methylhydriopolysiloxane endblocked at both terminals with trimethylsiloxy groups, a copolymer of methylhydriosiloxane and dimethylsiloxane endblocked at both terminals with trimethylsiloxy groups, a copolymer of methylhydriosiloxane and dimethylsiloxane endblocked at both terminals with dimethylhydriosiloxy groups, tetramethyltetrahydriocyclotetrasiloxane, and the like. In preferred practice, the amount of silicon-bonded hydrogen in component (E) will be such that the molar ratio of silicon bonded-hydrogen in component (E) to alkenyl groups in component (A) is 0.5:1 to 10:1. Compounds known in the art as agents for regulating the catalytic activity of platinum catalysts, such as 1-ethynyl-cyclohexanol, 3,-methyl-1-penten-3-ol, or benzotriazole, may be added as well.

The present composition comprises components (A) to (E) described hereinabove. Additives known in the art for inclusion in silicone rubber sponge compounds may be included as well, provided that the objects of the invention are not impaired thereby. Examples of such additives include heat stability agents such as iron oxide, cerium oxide, and fatty acid cerium salts; flame retardants such as manganese carbonate, zinc carbonate, and fumed titanium dioxide; pigments such as red iron oxide, titanium dioxide, and carbon black; and silicone oils such as dimethylsilicone oil and methylphenylsilicone oil. The present composition can be easily prepared by mixing components (A) to (E) plus any other ingredients that may be required. In preferred practice, component (A) is premixed with component (B) to produce a silicone rubber base compound, to which are then added components (C), (D), and (E). Examples of production equipment are kneader mixers, continuous kneader extruders, and other mixing or blending units.

Silicone rubber sponges may be produced from the present compositions by heating the composition to a temperature above the softening point of the thermoplastic resin of component (B) and curing. Silicone rubber sponges are formed by blowing and curing of compositions of the invention. Silicone rubber sponges produced in this way have fine, uniform cells and excellent mechanical strength, making them useful as construction material airtight retaining gaskets, fire resistant gaskets, sealing materials, O-rings, and cushioning materials, as well as sheath materials for rollers in copiers and the like.

EXAMPLES

A fuller understanding of the invention is provided through the following examples. Proportions are expressed on a weight basis. Viscosity and Williams plasticity were measured at 25° C. Williams plasticity was measured as follows. Williams plasticity was measured by a plasticity test in accordance with JIS K6249: 1997 "Testing methods for uncured and cured silicone rubber." A tubular test piece (2 cm³ volume) was prepared from silicone gum. The test piece was sandwiched between pieces of cellophane paper and placed in a parallel plate plastometer (WILLIAMS PLASTOMETER manufactured by Shimadzu Seisakusho) equipped with a dial gage. A 49 N load was applied, and after 2 minutes the dial gage was read. Test piece thickness (mm) was recorded and multiplied by 100 to give plasticity.

Reference Example 1

A silicone resin (softening point 80° C., specific gravity 1.20) composed of dimethylsiloxane units and methylphenylsiloxane units in a 22:78 molar ratio was dissolved in dichloromethane, and the resultant solution (solids content 30 wt %) was delivered at a rate of 100 cc/min. to a dynamic mixer together with pure water delivered at a rate of 25 cc/min., where they were mixed to produce an aqueous dispersion. Using a two fluid nozzle, the aqueous dispersion was sprayed continuously into a spray dryer with a hot nitrogen gas stream. The hot nitrogen gas stream temperature was 70° C. and pressure was 0.05 MPa. The resultant hollow silicone resin particles were immersed for 24 hours in an aqueous solution consisting of 100 parts pure water and 1 part nonionic surfactant (trimethylnonanol ethylene oxide adduct). Floating hollow silicone resin particles were separated and collected. The hollow silicone resin particles had an average particle size of 40 μm and shell wall average thickness of 4 μm and contained nitrogen gas enclosed therein.

Reference Example 2

An acrylic resin with a softening point of 85° C. (trade name ELVACITE 2008 manufactured by DuPont) was dissolved in dichloromethane and the resultant dichloromethane solution (solids content 10 wt %) was delivered at a rate of 100 cc/min. to a dynamic mixer together with pure water delivered at a rate of 25 cc/min., where they were mixed to produce an aqueous dispersion. Using a two fluid nozzle, the dispersion was sprayed continuously into a spray dryer with a hot nitrogen gas stream. The hot nitrogen gas stream temperature was 80° C. and pressure was 0.025 MPa. The resultant hollow acrylic resin particles were immersed for 24 hours in an aqueous solution consisting of 100 parts pure water and 1 part nonionic surfactant (trimethylnonanol ethylene oxide adduct). Floating hollow acrylic resin particles were separated and collected. The hollow acrylic resin particles had an average particle size of 20 μm and shell wall average thickness of 4 μm and contained nitrogen gas enclosed therein.

Example 1

100 Parts of an organopolysiloxane gum (viscosity 20,000,000 mPa·s, Williams plasticity 160) composed of 99.6 mol % dimethylsiloxane units and 0.4 mol % methylvinylsiloxane units and endblocked at both terminals with dimethylvinylsiloxy groups, 10 parts of a dimethylsiloxane oligomer endblocked at both terminals with silanol groups and having viscosity of 60 mPa·s, and 40 parts of dry process silica with a specific surface area of 200 m²/g were charged to a kneader mixer and kneaded under heating until homogenous to prepare a silicone rubber base compound. To 100 parts of the silicone rubber base compound were added 0.4 part p-methylbenzoyl peroxide, 0.5 part dicumyl peroxide, 1 part of the hollow silicone particles prepared in Reference Example 1, and 0.5 part distilled water. The mixture was kneaded on a two-roll mill to produce a silicone rubber sponge composition. The composition was formed into a sheet 3 mm thick which was then cured by heating in a 230° C. oven for 10 minutes to produce a silicone rubber sponge sheet. The cells of the silicone rubber sponge sheet were examined and found to be substantially uniform with an average cell diameter of 400 μm.

Example 2

The silicone rubber sponge composition of Example 1 was charged to a 65 mmφ (φ=diameter) single screw extruder and extruded in a tube profile. The product was heated for 4 minutes in a 230° C. oven to produce a silicone rubber sponge tube. This silicone rubber sponge tube had substantially uniform cells with an average cell diameter of 350 μm.

Example 3

16 cm³ of the silicone rubber sponge composition of Example 1 was charged to a compression mold (32 cm³ cavity capacity) and heated for 15 minutes at 170° C. to produce a silicone rubber sponge sheet. This silicone rubber sponge sheet nicely filled the mold and had substantially uniform cells.

Example 4

100 Parts of an organopolysiloxane gum (viscosity 20,000,000 mPa·s, Williams plasticity 160) composed of 99.6 mol % dimethylsiloxane units and 0.4 mol % methylvinylsiloxane units and endblocked at both terminals with dimethylvinylsiloxy groups, 5 parts of a dimethylsiloxane oligomer endblocked at both terminals with silanol groups and having viscosity of 60 mPa·s, 15 parts of dry process silica with a specific surface area of 200 m²/g, and 25 parts of wet process silica with a specific surface area of 130 m²/g were charged to a kneader mixer and kneaded under heating until homogenous to prepare a silicone rubber base compound. To 100 parts of the resultant silicone rubber base compound were added 1 part of a trimethylsiloxyl-endblocked dimethylsiloxane/methylhydriosiloxane copolymer (viscosity 25 mPa·s), 0.002 part of 1-ethynyl-1-cyclohexanol (a hydrosilylation inhibitor), a chloroplatinic acid/tetramethyldivinyl-disiloxane complex in an amount equivalent to 3 ppm (based on weight) as platinum atoms, based on the organopolysiloxane gum weight, 0.5 part of the hollow acrylic resin particles prepared in Reference Example 2, and 1 part octamethylcyclotetrasiloxane. The mixture was kneaded on a two-roll mill to produce a silicone rubber sponge composition. The composition was formed into a sheet 3 mm thick which was then cured by heating in a 230° C. oven for 10 minutes to produce a silicone rubber sponge sheet. The cells of the silicone rubber sponge sheet were examined and found to be substantially uniform with an average cell diameter of 300 μm.

Example 5

The silicone rubber sponge composition of Example 4 was charged to a 65 mmφ single screw extruder and extruded into a tube profile. The product was heated for 5 minutes in a 230° C. oven to produce a silicone rubber sponge tube. This silicone rubber sponge tube had substantially uniform cells with an average cell diameter of 250 μm.

Example 6

16 cm³ of the silicone rubber sponge composition of Example 4 was charged to a compression mold (32 cm³ cavity capacity) and heated for 20 minutes at 170° C. to produce a silicone rubber sponge sheet. This silicone rubber sponge sheet nicely filled the mold and had substantially uniform cells.

Example 7

The silicone rubber sponge composition prepared in Example 1 was coated onto the outside of a roller core and set in a roller mold. Using a compression mold the silicone rubber sponge composition was cured by heating for 10 minutes at 170° C. to produce a silicone rubber sponge-sheathed roller. The cells of the silicone rubber sponge-sheathed roller were examined and found to be substantially uniform with an average cell diameter of 300 μm.

Example 8

The silicone rubber sponge composition prepared in Example 4 was coated onto the outside of a roller core and set in a roller mold. Using a compression mold the silicone rubber sponge composition was cured by heating for 10 minutes at 170° C. to produce a silicone rubber sponge-sheathed roller. The cells of the silicone rubber sponge-sheathed roller were examined and found to be substantially uniform with an average cell diameter of 280 μm.

Comparative Example 1

A silicone rubber sponge composition was prepared as in Example 1, but omitting the hollow silicone resin particles used in Example 1. The composition was formed into a sheet 3 mm thick which was then cured by heating in a 230° C. oven for 10 minutes to produce a silicone rubber sponge sheet. The silicone rubber sponge sheet had nonuniform cells, with some cells as large as 2500 μm in diameter.

Comparative Example 2

The silicone rubber sponge composition of Comparative Example 1 was charged to a 65 mmφ single screw extruder and extruded into a tube profile. The product was heated for 5 minutes in a 230° C. oven to produce a silicone rubber sponge tube. The cells were large and nonuniform, with some cells as large as 2500 μm in diameter.

Comparative Example 3

16 cm³ of the silicone rubber sponge composition of Comparative Example 1 was charged to a compression mold (32 cm³ cavity capacity) and heated for 15 minutes at 170° C. to produce a silicone rubber sponge sheet. This silicone rubber sponge sheet did not fill the mold and had nonuniform cells.

Comparative Example 4

A silicone rubber sponge composition was prepared as in Example 4, but omitting the hollow acrylic resin particles used in Example 4. The composition was formed into a sheet 3 mm thick which was then cured by heating in a 230° C. oven for 10 minutes to produce a silicone rubber sponge sheet. The silicone rubber sponge sheet had nonuniform cells, with some cells as large as 2,000 μm in diameter.

Comparative Example 5

The silicone rubber sponge composition of Comparative Example 4 was charged to a 65 mmφ single screw extruder and extruded into a tube profile. The product was heated for 5 minutes in a 230° C. oven to produce a silicone rubber sponge tube. The cells were nonuniform, with some cells as large as 1500 μm in diameter.

Comparative Example 6

16 cm³ of the silicone rubber sponge composition of Comparative Example 4 was charged to a compression mold (32 cm³ cavity capacity) and heated for 15 minutes at 170° C. to produce a silicone rubber sponge sheet. While the silicone rubber sponge sheet filled the mold, its cells were nonuniform.

We claim:

1. A silicone rubber sponge composition comprising
   (A) 100 parts by weight organopolysiloxane gum described by average structural unit $R_aSiO_{(4-a)/2}$, where R is a monovalent hydrocarbon group or haloalkyl and a is 1.8 to 2.3 and having a viscosity of 1,000,000 mPa·s or above at 25° C.,
   (B) 1 to 400 parts by weight inorganic filler,
   (C) 0.01 to 50 parts by weight hollow thermoplastic resin particles,
   (D) 0.1 to 10 parts by weight liquid blowing agent with a boiling point above room temperature, and
   (E) a curing agent in an amount sufficient to cure the composition.

2. The silicone rubber sponge composition according to claim 1, where component (C) comprises thermoplastic resin shells having a softening point of from 40° C. to 200° C. and having a gas enclosed therein.

3. The silicone rubber sponge composition according to claim 1, where the thermoplastic resin of component (C) is selected from the group consisting of silicone resin, acrylic resin, and polycarbonate resin.

4. The silicone rubber sponge composition according to claim 1, where component (D) is water.

5. The silicone rubber sponge composition according to claim 1, where component (D) is a dimethylcyclopolysiloxane.

6. A silicone rubber sponge article comprising the reaction product of a composition comprising
   (A) 100 parts by weight organopolysiloxane gum described by average structural unit $R_aSiO_{(4-a)/2}$, where R is a monovalent hydrocarbon group or haloalkyl and a is 1.8 to 2.3 and having a viscosity of 1,000,000 mPa·s or above at 25° C.,
   (B) 1 to 400 parts by weight inorganic filler,
   (C) 0.01 to 50 parts by weight hollow thermoplastic resin particles,
   (D) 0.1 to 10 parts by weight liquid compound with a boiling point above room temperature, and
   (E) a curing agent in an amount sufficient to cure the composition.

7. A silicone rubber sponge article according to claim 6 prepared by a process selected from the group consisting of extrusion molding and compression molding.

8. A silicone rubber sponge article according to claim 6, where the article is selected from the group consisting of a sheet, tube, gasket, and sheath material for a roller.

9. The silicone rubber sponge composition according to claim 1, where component (A) has a viscosity at 25° C. of 5,000,000 mPa·s.

10. The silicone rubber sponge composition according to claim 1 comprising as component (B) 1 to 100 parts by weight of a reinforcing filler.

11. The silicone rubber sponge composition according to claim 1, where component (C) has a softening point of from 60 to 180° C.

12. The silicone rubber sponge composition according to claim 1, where component (C) has an average particle size within the range of 1 to 50 μm.

13. The silicone rubber sponge composition according to claim 1, comprising 0.1 to 40 parts by weight of component (C) per 100 parts by weight of component (A).

14. The silicone rubber sponge composition according to claim 1, where component (E) is an organic peroxide.

15. The silicone rubber sponge composition according to claim 1, where component (E) comprises a platinum catalyst and an organopolysiloxane containing silicon-bonded hydrogen.

* * * * *